(12) United States Patent
Kasashima

(10) Patent No.: US 6,735,090 B1
(45) Date of Patent: May 11, 2004

(54) HIGH-SPEED MEMORY DEVICE, SOCKET MOUNTING STRUCTURE FOR MOUNTING A HIGH-SPEED MEMORY DEVICE AND MOUNTING METHOD OF MOUNTING HIGH-SPEED MEMORY DEVICE

(75) Inventor: Masahiko Kasashima, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 594 days.

(21) Appl. No.: 09/653,898

(22) Filed: Sep. 1, 2000

(30) Foreign Application Priority Data

Sep. 30, 1999 (JP) ............................................ 11-278225

(51) Int. Cl.[7] ................................................ H05K 7/06
(52) U.S. Cl. .......................... 361/788; 361/777; 365/51; 365/52; 365/63; 326/30; 710/301
(58) Field of Search ................................. 361/736, 737, 361/777, 785, 788–790, 803; 365/51, 52, 63, 206, 230.03; 326/30; 710/300, 301

(56) References Cited

U.S. PATENT DOCUMENTS

| | | | | |
|---|---|---|---|---|
| 5,530,623 A | * | 6/1996 | Sanwo et al. ................ | 361/788 |
| 5,847,985 A | | 12/1998 | Mitani et al. ................. | 365/63 |
| 6,008,682 A | * | 12/1999 | Mirov ......................... | 327/333 |
| 6,028,781 A | * | 2/2000 | Vogley et al. ................ | 365/52 |
| 6,081,430 A | * | 6/2000 | La Rue ........................ | 361/788 |
| 6,104,629 A | * | 8/2000 | Wu .............................. | 365/63 |
| 6,308,232 B1 | * | 10/2001 | Gasbarro ..................... | 710/100 |
| 6,328,572 B1 | * | 12/2001 | Higashida et al. ............ | 439/61 |
| 6,392,897 B1 | * | 5/2002 | Nakase et al. .............. | 361/785 |
| 6,526,465 B1 | * | 2/2003 | Voth et al. .................. | 710/301 |
| 6,628,537 B1 | * | 9/2003 | Wallace et al. .............. | 365/52 |
| 6,657,871 B2 | * | 12/2003 | Perino et al. ............... | 361/760 |

OTHER PUBLICATIONS

The Indispensable PC Hardware Book (2nd edition, 1995) by Hans–Peter Messmer, published by Addison–Wesley Publishing Company, pp. 140–142.*

* cited by examiner

Primary Examiner—John B. Vigushin
(74) Attorney, Agent, or Firm—Foley & Lardner LLP

(57) ABSTRACT

A memory device is constructed by connecting a plurality of flat high-speed memory modules each including a connector on one side of which input side and output side terminals for dealing with a high-speed signal of plural-bit width whose impedance is controlled and which is transmitted from a memory controller to a terminal resistor are arranged. The memory device in which memory modules can be cascade-connected and which can maintain the impedance of a memory bus signal in a constant value by use of an inexpensive multi-layered circuit board structure is provided. A socket mounting structure of the memory device and a mounting method of the memory device is provided.

11 Claims, 3 Drawing Sheets

HIGH-SPEED MEMORY DEVICE, SOCKET MOUNTING STRUCTURE FOR MOUNTING A HIGH-SPEED MEMORY DEVICE AND MOUNTING METHOD OF MOUNTING HIGH-SPEED MEMORY DEVICE

CROSS-REFERENCE TO RELATED APPLICATIONS

This application is based upon and claims the benefit of priority from the prior Japanese Patent Application No. 11-278225, filed Sep. 30, 1999, the entire contents of which are incorporated herein by reference.

BACKGROUND OF THE INVENTION

This invention relates to a high-speed memory device constructed by connecting a plurality of flat high-seed memory modules to one another, each module having input and output side terminals arranged on one side thereof, for dealing with a high-speed signal of plural-bit width, impedance of the high-speed signal being controlled, and the high-speed signal is transmitted from a memory controller to a terminal resistor.

Further, this invention relates to a high-speed memory device constructed by connecting a plurality of flat high-seed memory modules to one another, each module having a metal cover on the surface thereof ,and each module including a connector that has two sets of terminals arranged on one side thereof, for dealing with a high-speed signal of plural-bit width, impedance of the high-speed signal being controlled.

There is provided a high-speed memory device constructed by connecting a plurality of flat high-seed memory modules to one another, each module having input and output side terminals arranged on one side thereof, for dealing with a high-speed signal of plural-bit width, impedance of the high-speed signal being controlled. The high-speed signal is transmitted from a memory controller to a terminal resistor. As the memory device, for example, there is provided a memory device which is realized by use of the mounting technology of an SO-RIMM (RIKM (Rambus Inline Memory Module) for notebook-sized personal computer proposed by U.S. Rambus Co.).

For the SO-RIMM, a socket (SO-RIMM socket) is used. In the general layout, a memory controller, first SO-RIMM socket, second SO-RIMM socket and terminal resistor are linearly arranged. Further, for a Rambus signal which requires preset impedance precision, a multi-layered circuit board of eight or more layers is used and the impedance matching is maintained by transmitting the Rambus signal through the internal layer of the circuit board.

FIG. 1 shows the outer armor structure of the SO-RIMM. An SO-RIMM 50 has a flat rectangular shape. On one side of the SO-RIMM, connector portions 51a, 51b respectively having input side and output side terminals for a Rambus signal which is transmitted from a memory controller to a terminal resistor are arranged. Further, a metal cover (heat-spreader also having a function of protection) 52 is disposed on the module surface.

By use of an SO-RIMM socket or sockets, SO-RIMMS are electrically connected to each other, and the SO-RIMM of the above structure is electrically connected to a memory controller, terminal resistor module, clock generator or the like.

If the high-speed memory device is realized by connecting a plurality of SO-RIMMs in a cascade-connection form, a multi-layered circuit board of eight or more layers is used so as to permit the Rambus signal to be transmitted along the internal layer. Therefore, a problem that the cost will be greatly increased occurs. Further, if the Rambus signal is transmitted through the internal layer, it becomes difficult to enhance the impedance precision in comparison with a case wherein the Rambus signal is transmitted along the surface layer. Therefore, there occurs a problem that the manufacturing cost will be raised owing to difficulty in the design and a low manufacturing yield caused by requirement for high precision on the manufacturing process.

BRIEF SUMMARY OF THE INVENTION

An object of this invention is to provide a high-speed memory device in which high-speed memory modules can be cascade-connected with an inexpensive multi-layered circuit board structure and the impedance for a memory bus signal can be kept constant, a socket mounting structure of the high-speed memory device, and a mounting method for the high-speed memory device.

Another object of this invention is to provide a high-speed memory device for effecting a stable a high-speed memory operation with an inexpensive multi-layered circuit board structure by transmitting a high-speed signal of plural-bit width whose impedance is kept constant through a plurality of cascade-connected high-speed memory modules by use of the surface pattern of a multi-layered circuit board, a socket mounting structure of the high-speed memory device, and a mounting method for the high-speed memory device.

Still another object of this invention is to provide a high-speed memory device in which an inexpensive mother board with a less number of layers which is advantageous in cost is used when the high-speed memory device is realized by use of a plurality of SO-RIMMs, a Rambus signal which requires preset impedance precision is wired on the surface layer thereof and the SO-RIMM is stably operated by use of the mother board with an inexpensive layer structure without giving any influence on the Rambus signal pattern on the mother board even if the SO-RIMM is mounted, a socket mounting structure of the high-speed memory device, and a mounting method for the high-speed memory device.

According to this invention, the above object can be attained by-a memory device comprising:

a plurality of storage means for storing information;

means for controlling the storage means; means, having a resistance, for terminating an electric signal; and a pattern wiring for electrically connecting the plurality of storage means, the controlling means and the terminating means;

wherein the plurality of storage means, the controlling means and the terminating means are arranged on a board, and the pattern wiring being located in a preset position on the board other than a position in which the storage means is located.

Further, according to this invention, the above object can be attained by a socket mounting structure of a memory device comprising:

a plurality of storage means for storing information;

means for controlling the storage means;

means, having a resistance, for terminating an electric signal; and a pattern wiring for electrically connecting the plurality of storage means, the controlling means and the terminating means;

wherein the plurality of storage means, the controlling means and the terminating means are mounted on a board, and the pattern wiring being located in a preset position on the board other than a position in which the storage means is located.

Moreover, according to this invention, the above object can be attained by a mounting method of a memory device comprising:

mounting on a board a plurality of storage means for storing information;

mounting on the board a means for controlling the storage means;

mounting on the board a means, having a resistance, for terminating an electric signal; and mounting on the board a pattern wiring for electrically connecting the plurality of storage means, the controlling means and the terminating means;

wherein the pattern wiring is located in a preset position on the board other than a position in which the storage means is located.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

This invention is to realize a high-speed memory device constructed by connecting a plurality of flat high-speed memory modules (for example, SO-RIMMs), each of which has a metal cover formed on the surface thereof and includes a connector having two sets of terminals arranged on one side thereof, for dealing with a high-speed signal (for example, a Rambus signal) of plural-bit width whose impedance is controlled. That is, high-speed signal lines between the connectors of at least two high-speed memory modules are wired in a portion other than the metal cover surfaces of the high-speed memory modules, and a high-speed signal is transmitted by use of a surface layer pattern of the multi-layered circuit board. As a result, a four-layered or six-layered circuit board (mother board) is used, a line through which the high-speed signal (for example, Rambus signal) with plural-bit width is transmitted is wired on the surface layer, and an influence on the impedance of the Rambus signal wiring can be prevented.

By realizing the high-speed memory device of this invention, a four-layered or six-layered mother board which is advantageous in cost is used, a high-speed memory bus signal line which requires determined preset impedance precision is wired on the surface layer. It becomes possible to stably operate the high-speed memory module by use of the inexpensive mother board with a less number of layers. It also becomes possible to give little influence on the high-speed memory bus signal pattern on the mother board composed of a less number of layers even if the high-speed memory module is mounted on the mother board.

More specifically, the high-speed memory device is explained in the following embodiment. That is, when a plurality of SO-RIMMs are used to realize the high-speed memory device, a four-layered or six-layered mother board which is advantageous in cost is used without using an eight-layered mother board. At this time, a line through which a Rambus signal is transmitted and which requires preset impedance precision is wired on the surface layer. Further, the line is arranged so as not to give an influence on the Rambus signal pattern on the mother board even when the SO-RIMM is mounted on the mother board. Therefore, the SO-RIMM can be stably operated at high speed with the mother board structure which is advantageous in cost.

There will now be described embodiments of this invention with reference to the accompanying drawings. In this example, the construction and operation of the high-speed memory device are explained by using SO-RIMMs as a plurality of high-speed memory modules constructing the high-speed memory device and using a Rambus signal as a high-speed signal with plural-bit width whose impedance is controlled.

Figure 2:
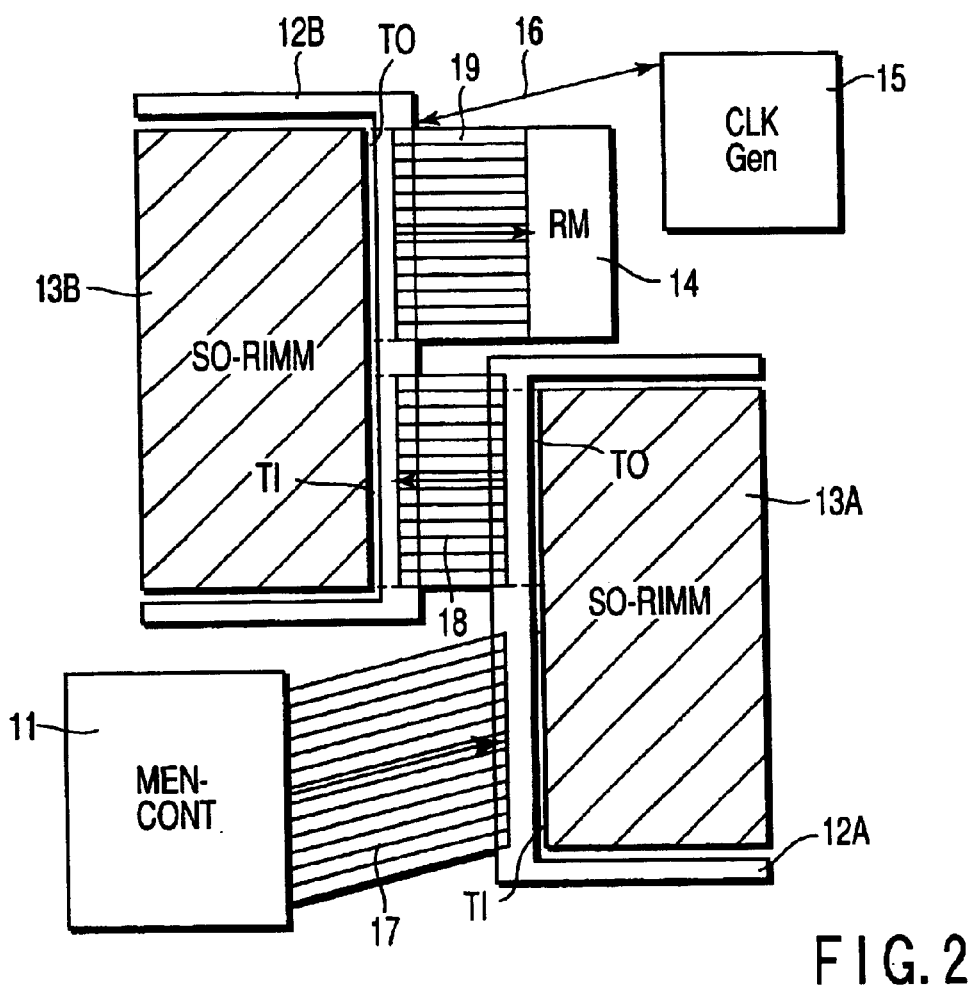
FIG. 2 is a block diagram showing the construction of a memory device according to one embodiment of this invention.

FIG. 2 is a diagram showing the mounting structure of the high-speed memory device having two SO-RIMMs on the mother board in one embodiment of this invention. In FIG. 2, the mother board is omitted.

In FIG. 2, MEM-CONT 11 denotes a memory controller which is a controller for a Direct Rambus memory. On an SO-RIMM socket 12A, a preceding-stage SO-RIMM 13A is mounted. On an SO-RIMM socket 12B, a succeeding-stage SO-RIMM 13B is mounted. The SO-RIMM 13A is a preceding-stage high-speed memory mounted on the SO-RIMM socket 12A. The SO-RIMM 13B is a succeeding-stage high-speed memory mounted on the SO-RIMM socket 12B. RM 14 denotes a terminal resistor module which is a terminal resistor of the Rambus signal. CLK-Gen 15 denotes a clock generator. A clock signal line 16 is used for a Rambus signal supplied from the terminal side. TI denotes an input side terminal of each of connectors provided on the SO-RIMM 12A and 12B, and TO denotes an output-side-terminal of each connector.

A pattern wiring 17 is a wiring of the surface layer on the mother board for transferring the Rambus signal from the memory controller (MEM-CONT) 11 to the input side terminal TI of the connector provided on the preceding-stage SO-RIMM 13A mounted on the SO-RIMM socket 12A.

A pattern wiring 18 is a wiring of the surface layer on the mother board for transferring the Rambus signal from the output side terminal TO of the connector provided on the preceding-stage SO-RIMM 13A mounted on the SO-RIMM socket 12A to the input side terminal TI of the connector provided on the succeeding-stage SO-RIMM 13B mounted on the SO-RIMM socket 12B.

A pattern wiring, 19 is a wiring of the surface layer on the mother board for connecting the terminal resistor module (RM) 14 to the output side terminal TO of the connector provided on the succeeding-stage SO-RIMM 13B mounted on the SO-RIMM socket 12B.

One-directional arrows shown in the pattern wirings 17, 18, 19 indicate the Rambus signal transferring direction.

In the mounting structure shown in FIG. 2, the SO-RIMM socket 12A on which the preceding-stage SO-RIMM 13A is mounted and the SO-RIMM socket 12B on which the succeeding-stage SO-RIMM 13B is mounted are arranged back to back with a distance of half connector portion shifted from each other.

In other words, the SO-RIMM socket 12A and the SO-RIMM socket 12B are arranged on the mother board so that the output side terminal TO of the connector provided on the preceding-stage SO-RIMM 13A and the input side terminal TI of the connector provided on the succeeding-stage SO-RIMM 13B will be set to face each other at a close distance.

Figure 1:
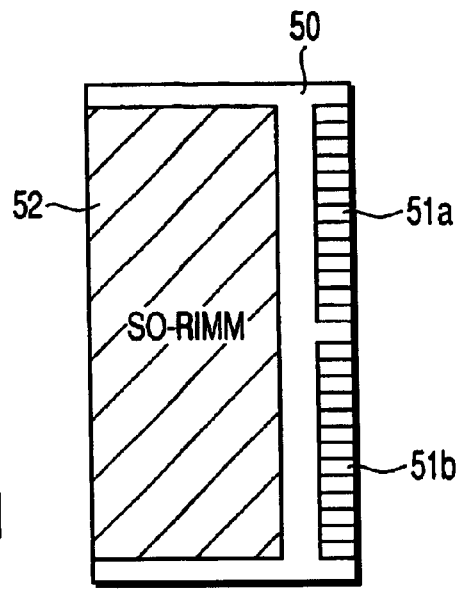
FIG. 1 is a view showing the structure of a high-speed memory module (SO-RIMM) according to this invention.

With the above arrangement and signal wiring thus made, since the Rambus signal does not pass through an area (at least an area of the metal covers of the SO-RIMMs) of the preceding-stage SO-RIMM 13A mounted on the SO-RIMM socket 12A and the succeeding-stage SO-RIMM 13B mounted on the SO-RIMM socket 12B in the pattern wirings 17, 18 and 19, an influence on the impedance (28 ohms±10%) by the metal cover (refer to FIG. 1) of the SO-RIMM can be prevented. Here, the pattern wirings are respectively wired from the memory controller (MEH-CONT) 11 to the SO-RIMK socket 12A, from the SO-RIM socket 12A to the SO-RIMM socket 12B, and from the SO-RIMM socket 12B to the terminal resistor module (RM) 14.

Therefore, a multi-layered circuit board such as a four-layered or six-layered circuit board which is relatively inexpensive can be used as a mother board and the cost of the whole device can be lowered.

Further, according to the mounting structure of the above embodiment, the pattern wirings 17, 18 and 19 for the Rambus signal are provided on the surface layer of the mother board. Therefore, in comparison with a case wherein the Rambus signal line is wired in the internal layer, it becomes easier to attain preset impedance precision. Further, in comparison with the conventional mounting structure, the whole wiring length can be reduced by arranging the SO-RIMM sockets 12A, 12B back to back as described above. Therefore, since the size of an area in which the Rambus signal requiring determined impedance (28 ohms±10%) precision, is transmitted can be reduced, the pattern design can be more easily made and the stable operation can be expected.

Figure 3:
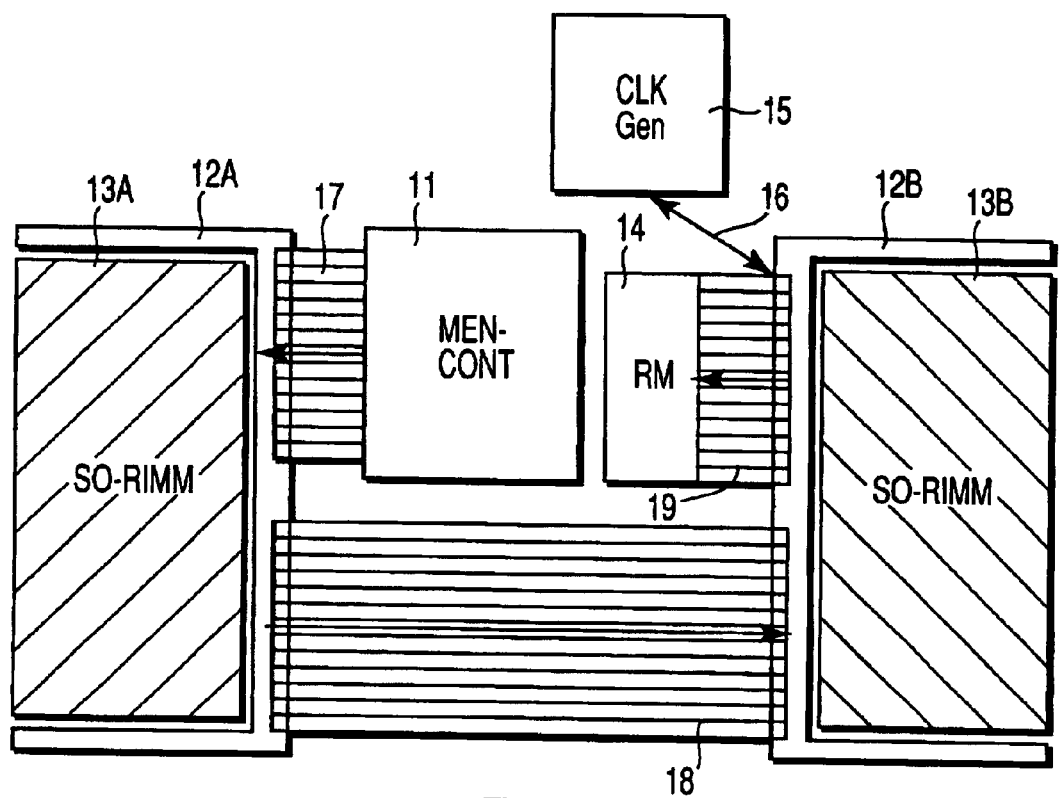
FIG. 3 is a block diagram showing the construction of a memory device according to another embodiment of this invention.

FIG. 3 is a diagram showing the mounting structure in another embodiment of this invention, and in this case, the mother board is also omitted. Portions which are the same as those of FIG. 2 are denoted by the same reference numerals and the explanation therefor is omitted.

In this embodiment, a SO-RIMM socket 12A and SO-RIMM socket 12B are arranged back to back. A memory controller (MEM-CONT) 11 and terminal resistor module (RM) 14 are arranged between the sockets.

Also, in the embodiment shown in FIG. 3, the Rambus signal does not pass through an area (at least an area of the metal covers of the SO-RIMMs) of a preceding-stage SO-RIMM 13A mounted on the SO-RIMM socket 12A and a succeeding-stage SO-RIMM 13B mounted on the SO-RIMM socket 12B in pattern wirings 17, 18 and 19 which are respectively wired from the memory controller (MEM-CONT) 11 to the SO-RIMM socket 12A, from the SO-RIMM socket 12A to the SO-RIMM socket 12B, and from the SO-RIMM socket 12B to the terminal resistor module (RM) 14. Therefore, an influence on the impedance (28 ohms±10%) by the metal cover (refer to FIG. 1) of the SO-RIMM can be prevented.

Therefore, a multi-layered circuit board such as a four-layered or six-layered circuit board which is relatively inexpensive can be used as a mother board and the cost of the whole device is lowered.

Further, according to the mounting structure of the above embodiment, the pattern wirings 17, 18 and 19 for transmitting the Rambus signal are provided on the surface layer of the mother board. Therefore, in comparison with a case wherein the Rambus signal line is wired in the internal layer, it becomes easier to attain preset impedance precision. Further, the pattern design can be made more easily and the stable operation can be expected. Further, since a line for the Rambus signal, the line requiring preset impedance precision, can be linearly disposed on the surface layer of the board, the impedance on the mother board can be easily controlled.

Next, still another embodiment of this invention is explained with reference to FIGS. 4 and 5.

In the above embodiments, the structure in which a plurality (two in the above embodiments) of SO-RIMMs are arranged on the same surface (one-side surface) of the mother board is explained. In the present embodiment, the structure in which one SO-RIMM among three SO-RIMMs is arranged on a different surface (the other surface) is shown. In FIGS. 4 and 5, portions which are the same as those of FIG. 2 are denoted by the same reference numerals and the explanation therefor is omitted.

Figure 4:
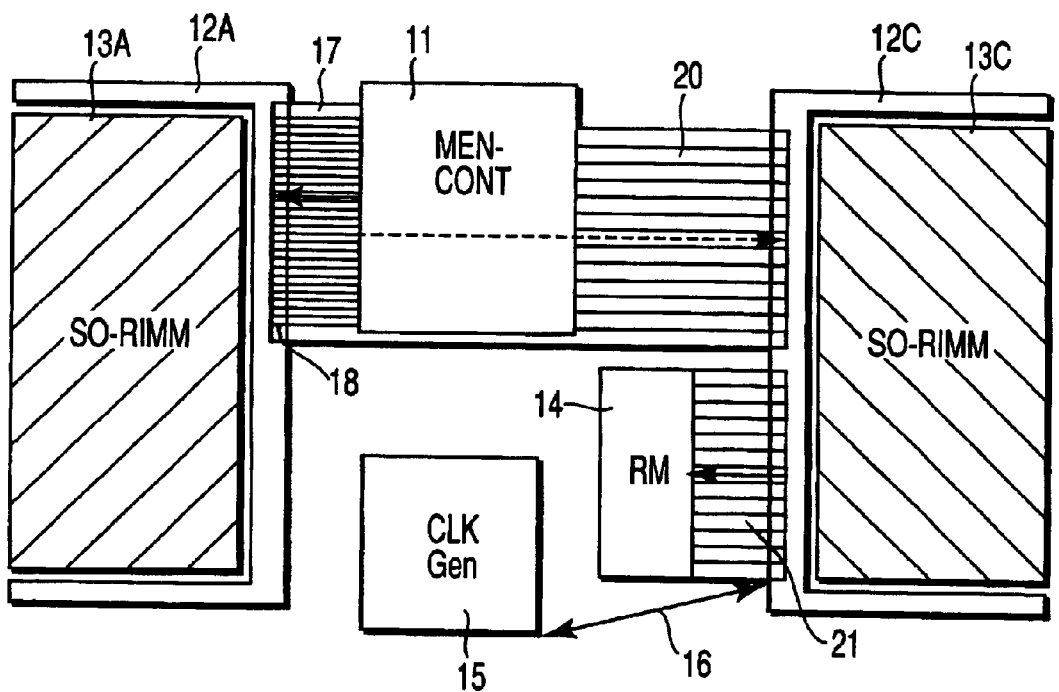
FIG. 4 is a block diagram showing the construction of a memory device according to still another embodiment of this invention.
Figure 5:
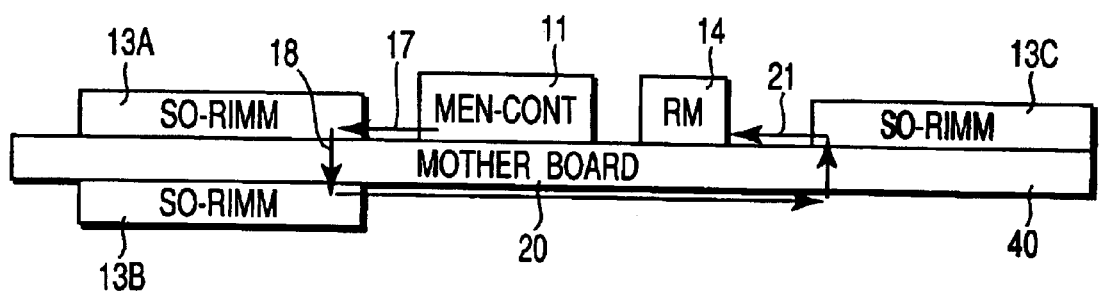
FIG. 5 is a block diagram showing a high-speed signal path (Rambus signal path) and the signal direction in the memory device shown in FIG. 4.

In the construction of the memory device of the present embodiment shown in FIGS. 4 and 5, a first (first-stage) SO-RIMM 13A and a second (second-stage) SO-RIMM 13B are arranged in the same position and different surfaces to face each other with a mother board 40 disposed between the different surfaces. In other words, SO-RIMM sockets 12A, 12B are provided on both sides of the mother board 40. Further, an SO-RIMM socket 12C on which a third (third-stage) SO-RIMM 13C is mounted is arranged in a back-to-back relation with respect to the SO-RIMM socket 12A. In this case, a pattern wiring 18 is wired by use of a through hole between the SO-RIMM socket 12A on which the first (first-stage) SO-RIMM 13A is mounted and the SO-RIMM socket 12B on which the second (second-stage) SO-RIMM 13B is mounted. Further, a pattern wiring 20 is wired between the SO-RIMM socket 12B on which the second (second-stage) SO-RIMM 13B is mounted and the SO-RIMM socket 12C on which the third (third-stage) SO-RIMM 13C is mounted by use of the through hole and the surface layer patterns on which the sockets are disposed. In addition, a pattern wiring 21 is wired, on the mounting surface of the terminal resistor module (RM) 14, between the SO-RIMM socket 12C on which the third (third-stage) SO-RIMM 13C is mounted and the terminal resistor module (RM) 14.

In this example, all of the three sockets are formed of SO-RIMMS. However, one socket among the three sockets may be mounted on the mother board not as an SO-RIMM socket but as a CSP (Chip Size Package).

Further, a Rambus signal path extending from the memory controller (MEM-CONT) 11 to the terminal resistor module (RM) 14 via the SO-RIMM socket 12B, SO-RIMM socket 12A and SO-RIMM socket 12C can be formed.

Further, in a memory device having two SO-RIMM sockets mounted thereon, a Rambus signal path extending from the memory controller (MEM-CONT) 11 to the terminal resistor module (RM) 14 via the SO-RIMM socket 12A and SO-RIMM socket 12B may be formed.

In either case, the pattern wiring through which the Rambus signal is transmitted is wired so as not to pass through an area in which the SO-RIMM attached to the SO-RIMM socket is mounted. Therefore, an influence on the impedance (28 ohms±10%) by the metal cover of the SO-RIMM can be prevented.

Therefore, a multi-layered circuit board such as a four-layered or six-layered circuit board which is relatively inexpensive can be used as a mother board and the cost of the whole device is lowered.

Further, according to the mounting structure of the above embodiment, the pattern wirings 17, 18, 20 and 21 for the Rambus signal are provided on the surface layer of the mother board. Therefore, in comparison with a case wherein the Rambus signal line is wired in the internal layer it becomes easier to attain preset impedance precision and make the pattern design.

In the above embodiments, a memory construction having two SO-RIMMs mounted on the same surface of the mother board is explained as an example. However, this invention is not limited to this memory construction and this invention can also be applied to a memory construction having three or more high-speed memory modules mounted on the same surface of the mother board.

As described above, according to this invention, when a high-speed memory device constructed by connecting a plurality of flat high-speed memory modules, the modules can be cascade-connected between the high-speed memory modules with the impedance of signals in connected lines thereof kept constant by use of an inexpensive multi-layered circuit board structure. Each of the flat high-speed memory modules includes a connector having input side and output side terminals arranged on one side, the terminals being set for dealing with a high-speed signal of plural-bit width whose impedance is controlled and which is transmitted from a main controller to a terminal resistor is realized thereof.

Further, according to this invention, when a high-speed memory device constructed by connecting a plurality of flat high-speed memory modules each including a connector having input side and output side terminals arranged on one side thereof, for dealing with a high-speed signal of plural-bit width whose impedance is controlled and which is transmitted from a memory controller to a terminal resistor is realized, the surface pattern of a multi-layered circuit board is used and high-speed memory modules can be cascade-connected between the high-speed memory modules with the impedance thereof kept constant. As a result, a stable high-speed memory operation can be attained by use of an inexpensive multi-layered circuit board structure.

Further, according to this invention, when a high-speed memory device is realized by use of a plurality of SO-RIMMs, an inexpensive mother board which has a less number of layers and is advantageous in cost can be used. A Rambus signal requiring determined preset impedance precision is transmitted on the surface layer of the mother board. As a result, even when the SO-RIMM is mounted, no influence will be given to the Rambus signal pattern on the mother board. Further, the SO-RIMM can be stably operated by use of a mother board of inexpensive layer structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus provided with a first memory device and a second memory device which can be removably stored in a relatively flat space, the first and second memory devices including input terminals and output terminals, the electronic apparatus comprising:

a board;

a controller for controlling the memory devices, which is mounted on the board;

a resistance for terminating an electric signal, which is mounted on the board;

a first socket for supporting the first memory device, mounted on the board, and having a first terminal electrically connected to the input terminal of the first memory device and a second terminal electrically connected to the output terminal of the first memory device when the first memory device is set on the first socket;

a second socket for supporting the second memory device, mounted on the board, having a third terminal electrically connected to the input terminal of the second memory device and a fourth terminal electrically connected to the output terminal of the second memory device when the second memory device is set on the second socket; and a pattern wiring arranged on the board, the pattern wiring including a first wiring portion wired between the controller and the first terminal, a second wiring portion wired between the second terminal and the third terminal, and a third wiring portion between the fourth terminal and the resistance, wherein the pattern wiring is located in a preset position other than a position in which the first and second sockets are located.

2. The electronic apparatus according to claim 1, wherein the board has a multi-layered structure including a surface layer, and the pattern wiring is formed in the surface layer.

3. The electronic apparatus according to claim 1, further comprising a clock generator for supplying a clock signal to the first and second memory devices, the clock generator being mounted on the board.

4. The electronic apparatus according to claim 1, wherein the board has a first surface and a second surface opposed to the first surface, and wherein the controller, the resistance, and the first and second sockets are arranged on the first surface of the board.

5. The electronic apparatus according to claim 1, wherein the first and second sockets are so arranged on the first surface so that the second terminal of the first socket faces the third terminal of the second socket.

6. An electronic apparatus in which a first memory device, a second memory device, and third memory device can be removably stored, the first, second and third memory devices including input terminals and output terminals, the electronic apparatus comprising:

a board having a first surface and a second surface opposed to the first surface;

a controller for controlling the memory devices, which is mounted on the first surface of the board;

a resistance for terminating an electric signal, which is mounted on the fist surface of the board;

a first socket for supporting the first memory device, mounted on the first surface of the board, having a first terminal electrically connected to the input terminal of the first memory device and a second terminal electrically connected to the output terminal of the first memory device when the first memory device is set on the first socket;

a second socket for supporting the second memory device, mounted on the second surface of the board, having a third terminal electrically connected to the input terminal of the first memory device and a fourth terminal electrically connected to the output terminal of the second memory device when the second memory device is set on the second socket;

a third socket for supporting the third memory device, mounted on the first surface of the board, having a fifth terminal electrically connected to the input terminal of the first memory device and a sixth terminal electrically connected to the output terminal of the second memory device when the third memory device is set on the second socket; and a first pattern wiring including a first wiring portion wired between the controller and the first terminal on the first surface, a second wiring portion wired between the second terminal and the third terminal, which is extended through the board, a third wiring portions between the fourth terminal and the fifth terminal on the second surface, a fourth wiring portion between the fifth terminal and the sixth terminal, which is extended through the board, and a fifth wiring portion between the sixth terminal and the resistance on the first surface.

7. The electronic apparatus according to claim 6, wherein the board has a multi-layered structure including surface layers on the first and second surfaces, respectively, the first and fifth wiring portions are formed in the surface layer on the first or the third wiring portion is formed in the surface layer on second surface, and the second and fourth wiring portions are extended through the surface layers of the board.

8. The electronic apparatus according to claim 6, further comprising a clock generator for supplying a clock signal to the first and second memory devices, the clock generator being mounted on the first surface of the board.

9. A memory device comprising:

first, second and third storage means for storing information, each provided with input and output terminals;

means for controlling the first, second and third storage means, which is provided with an output terminal, the input terminal of the first storage means facing the output terminal of the means for controlling;

means having a resistance, for terminating an electric signal, which is provided with an input terminal, the output terminal of the third storage means facing the input terminal of the means for terminating; and pattern wirings for electrically connecting the output terminal of the means for controlling to the input terminal of the first storage means, the output terminal of the first storage means to the input terminal of the second storage means, the output terminal of the second storage means to the input terminal of the third storage means, and the output terminal of the third storage means to the input terminal of the means for terminating to transmit the electric signal;

a board having a first board surface and a second board surface opposed to the first board surface, the first and third storage means, the means for controlling and the means for terminating being arranged on the first board surface, the second storage means being arranged on the second board surface, the pattern wiring being located in a preset position on the insulating portion of the board other than a position in which the storage means are located.

10. The memory device according to claim 9, wherein the board is composed of multiple layers.

11. The memory device according to claim 9, wherein the electric signal is transmitted from the means for controlling to the means for terminating.

\* \* \* \* \*